No. 742,756. PATENTED OCT. 27, 1903.
C. J. ULBRICHT.
NUT LOCK.
APPLICATION FILED MAY 25, 1903.
NO MODEL.

Witnesses:
R. H. Butler
E. E. Potter

Inventor,
C. J. Ulbricht,
By N. C. Evert & Co.
Attorneys.

THE NORRIS PETERS CO., PHOTO-LITHO., WASHINGTON, D. C.

No. 742,756.

Patented October 27, 1903.

UNITED STATES PATENT OFFICE.

CHARLES J. ULBRICHT, OF CLIFF MINE, PENNSYLVANIA, ASSIGNOR OF ONE-FOURTH TO JOHN BERNHARD, OF CLIFF MINE, PENNSYLVANIA.

NUT-LOCK.

SPECIFICATION forming part of Letters Patent No. 742,756, dated October 27, 1903.

Application filed May 25, 1903. Serial No. 158,603. (No model.)

*To all whom it may concern:*

Be it known that I, CHARLES J. ULBRICHT, a citizen of the United States of America, residing at Cliff Mine, in the county of Allegheny and State of Pennsylvania, have invented certain new and useful Improvements in Nut-Locks, of which the following is a specification, reference being had therein to the accompanying drawings.

This invention relates to certain new and useful improvements in nut-locks, and has for its object the provision of novel means whereby a nut when once secured upon the shank of a bolt will be firmly held in this position.

Another object of my invention is the provision of a novel nut-lock which will allow the nut to be readily adjusted without removing the nut-lock proper.

A further object of my invention is to provide a nut-lock which will be extremely simple in construction, strong and durable, comparatively inexpensive to manufacture, and one which may be readily operated when it is desired to remove the nut from the shank of the bolt.

Briefly described, my invention comprises a nut carrying a tubular extension, this tubular extension being corrugated or grooved, and upon this extension I secure an enlarged washer-carrying means for engaging the corrugated surface of the nut, this enlarged washer being secured to the shank of the bolt by any suitable means.

In describing the invention in detail, reference is had to the accompanying drawings, forming a part of this specification, and wherein like numerals of reference indicate like parts throughout the several views, in which—

Figure 1:
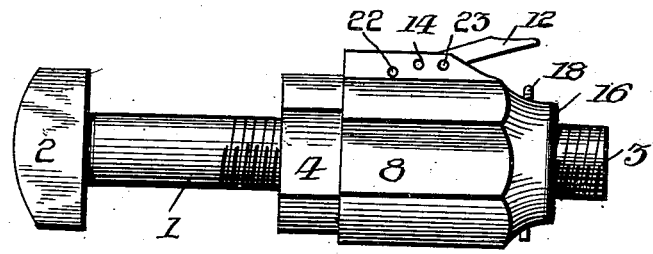
Figure 2:
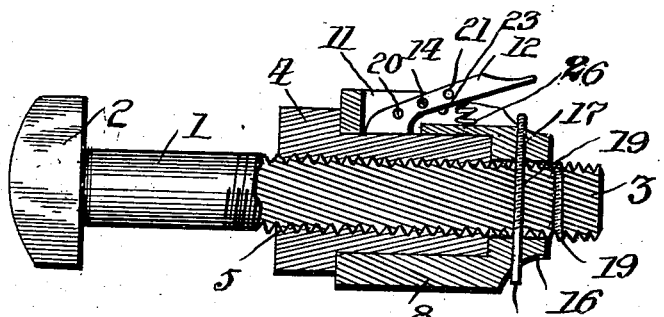
Figure 3:
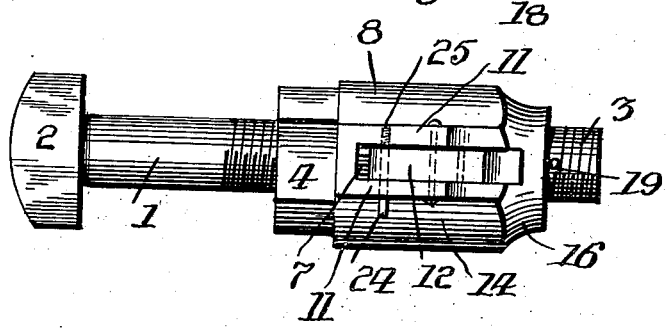
Figure 4:
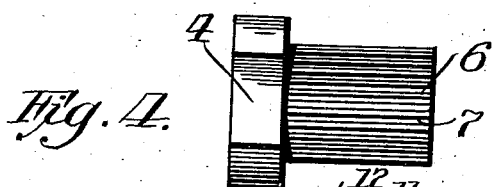
Figure 5:
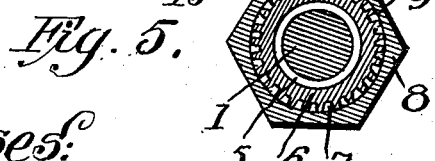

Figure 1 is a side elevation of my improved nut-lock. Fig 2 is a longitudinal sectional view of the same. Fig. 3 is a top plan view of the nut-lock. Fig. 4 is a detail view of the nut, and Fig. 5 is a vertical sectional view of my improved nut-lock.

To put my invention into practice, I provide the ordinary form of bolt 1, carrying the enlarged head 2 and upon its outer end the threads 3. Upon the threaded portion of this bolt I secure the hexagon-shaped nut 4, which is internally screw-threaded, as indicated at 5, and formed integral with said nut is the tubular extension 6, the inner periphery of which is threaded similarly to the nut, and around the outer periphery is formed the corrugations or grooves 7. Adapted to engage over this grooved tubular extension is the enlarged hexagon-shaped nut or washer 8, the inner periphery of which is smooth, as indicated at 9, and in one of the hexagon-shaped faces of the nut is formed a groove 10, and upon this face is formed the upwardly-extending lugs 11, in which are journaled the pawl or dog 12 by means of the journal-pin 14, the lower end of said pawl or dog carrying teeth 15, which are adapted to engage in the corrugated or grooved surface of the nut 6. The outer end of the nut or washer 8 is tapered, as indicated at 16, and has formed therein an aperture 17, through which passes the pin 18, apertures 19 having been provided in the threaded portion of the bolt, as illustrated in Fig. 2 of the drawings.

The pawl or dog 12 carries the apertures 20 and 21, and in the upwardly-extending lugs 11 are formed apertures 22 23, and when it is desired to lock the pawl in one position or the other a pin 24 is employed, as illustrated in Fig. 3 of the drawings, the one end of said pin being threaded, as indicated at 25, into the apertures formed in one of the lugs. To normally hold the pawl 12 in engagement with the grooved nut 6, I provide a spring 26, mounted between the lugs 7, one end of said spring engaging the under face of the pawl or dog 12, whereby the toothed end is normally held in engagement with the grooved nut 6.

The manner of locking my improved nut upon the shank of a bolt is as follows: The nut 4, carrying the grooved or corrugated extension 6, having been placed on the threaded shank 1 and adjusted to the desired position, the enlarged nut or washer 8 is engaged over the grooved extension 6, and the pin 18 is forced through apertures 17 and 19, whereby the enlarged hexagon-shaped washer will be securely held upon the shank of the bolt. For the convenience of the operator I provide the apertures 20 21, formed in the pawl or dog 12, and when it is desired to lock the pawl in engagement with the grooved or corrugated extension 6 of the nut 4 the pin 24 is inserted in the aperture 22, through aperture 20, and engages in the aperture formed in the opposite lug, as illustrated in Fig. 3. The end of this pin may be threaded or not, as desired. To lock the pawl or dog 12 out of engagement with the corrugated or grooved extension 6 of the nut 4, the pin 24 is removed from aperture 22 and inserted in aperture 23 in the aperture 21 of the pawl or dog 12, whereby the spring 16 will be depressed and the pawl or dog 12 held out of engagement with the grooved extension 6 of the nut 4.

By providing a plurality of apertures in the shank of the bolt, preferably near its outer end, it may be readily seen how the enlarged washer or nut 8 may be adjusted according to the thickness of the material through which the shank of the bolt passes, and another feature to which I wish to call attention is that the nut 4 may be adjusted upon the shank of the bolt by disengaging the pawl 12 from the grooved extension 6, whereby the nut may be rotated.

While I have herein shown and described my invention as practiced by me, yet it will be obvious that various changes may be made in the details of construction without departing from the general spirit of the invention.

Having fully described my invention, what I claim as new, and desire to secure by Letters Patent, is—

1. In combination with a bolt having apertures formed near its outer end, a nut having a tubular extension, said extension being grooved or corrugated, said nut and tubular extension having the interior periphery threaded, said threads adapted to engage the thread upon the bolt, an auxiliary nut or washer having a central aperture formed longitudinally of its length, in which is received the extension of the first-named nut, the rear end of said auxiliary nut being formed with an aperture to receive a pin adapted to pass through the apertures formed in the outer end of the bolt, one side of the auxiliary nut or washer being cut away, and means mounted adjacent to said cut-away portion to prevent the first-named nut from turning, substantially as described.

2. In combination with a bolt having one or more apertures formed near its outer end, a nut having a tubular extension, said extension being grooved or corrugated, said nut and tubular extension being interiorly threaded, said threads adapted to engage the threads upon the bolt, an auxiliary nut or washer having a central aperture formed longitudinally at its length, to receive the extension of the first-named nut, the rear end of said auxiliary nut being formed with an aperture to receive a pin adapted to pass through the aperture formed in the outer end of the bolt, one side of the auxiliary nut or washer being cut away, lugs formed upon the nut adjacent to the cut-away portion, a pawl or dog mounted between said lugs, said pawl or dog adapted to engage the corrugated or grooved extension of the first-named nut, means whereby said pawl or dog is normally in engagement with said extension, means carried by the auxiliary nut or washer for locking the pawl in or out of position, substantially as described.

3. In combination with the bolt and a nut carried thereby, said nut having its exterior provided with raised portions, a second nut partly inclosing the first-named nut and being formed with a cut-out portion, lugs formed on opposite sides of said cut-out portion, said lugs each being formed with a plurality of openings, means for locking said nuts in position including a pawl for engagement with the raised portions of said first-named nut, and having its pivot engaging one aperture of each lug, and means for locking said pawl in position adapted for engagement with the remaining openings of said lugs, and the pawl.

4. In combination with the bolt, a pair of nuts mounted thereon, one of said nuts projecting into the other, and means for locking said nuts in position comprising a means rigidly carried by the bolt and projecting through the outer nut, and a movable means carried by the outer nut for engagement with a coöperating means carried by the inner nut, substantially as described.

In testimony whereof I affix my signature in the presence of two witnesses.

CHARLES J. ULBRICHT.

Witnesses:
E. E. POTTER,
K. H. BUTLER.